(12) United States Patent
Hibbs et al.

(10) Patent No.: US 7,816,482 B1
(45) Date of Patent: Oct. 19, 2010

(54) EPOXY-CROSSLINKED SULFONATED POLY(PHENYLENE) COPOLYMER PROTON EXCHANGE MEMBRANES

(75) Inventors: Michael Hibbs, Albuquerque, NM (US); Cy H. Fujimoto, Albuquerque, NM (US); Kirsten Norman, Albuquerque, NM (US); Michael A. Hickner, State College, PA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 12/411,451

(22) Filed: Mar. 26, 2009

(51) Int. Cl.
C08G 59/00 (2006.01)
C08G 61/02 (2006.01)
C08G 75/00 (2006.01)

(52) U.S. Cl. ............... 528/98; 528/86; 528/87; 528/373

(58) Field of Classification Search ............ 528/98
See application file for complete search history.

(56) References Cited

U.S. PATENT DOCUMENTS

| | | | |
|---|---|---|---|
| 5,126,427 A * | 6/1992 | Pfaendner et al. | 528/128 |
| 5,403,675 A | 4/1995 | Ogata et al. | |
| 5,886,130 A * | 3/1999 | Trimmer et al. | 528/171 |
| 6,590,067 B2 | 7/2003 | Kerres et al. | |
| 6,716,548 B1 | 4/2004 | Kaliaguine et al. | |
| 6,977,122 B2 | 12/2005 | Colombo et al. | |
| 7,022,810 B1 | 4/2006 | Cornelius | |
| 7,301,002 B1 * | 11/2007 | Cornelius et al. | 528/373 |
| 7,615,300 B2 * | 11/2009 | Bae | 429/33 |

OTHER PUBLICATIONS

Michael A. Ogliaruso, Michael G. Romanelli, & Ernest I. Becker, Chemistry of Cyclopentadienones, Chem Rev, 1965, 65 (3), 261-367 DOI: 10.1021/cr60235a001 Publication Date (web) May 1, 2002.
Michael A. Hickner, Cy H. Fujimoto, Chris J. Cornelius, Transport in Sulfonated Poly(Phenylene)s: Proton Conductivity, Permeability, and the State of Water, 0032-3861/$—see front matter c 2006 Published by Elsevier Ltd. Doi: 10.1016/j.polymer.2006.02.034.
Boris Mahltig & Manfred Stamm, Adsorption and Structure Formation of Semi-Rigid Polyelectrolytes, Acta Chim. Slov. 2005, 52, 404-407.
L.W. Shacklette, H. Eckhardt, R.R. Chance, G.G. Miller, D.M. Ivory & R. H. Baughman, Solid-State Synthesis of Highly Conducting Polyphenylene from Crystalline Oligomers, j. chem.. Phys. 73(8), Oct. 15, 1980, 1980 American Institute of Physics.
Cy H. Fujimoto, Michael A. Hickner, Christopher J. Cornelius & Douglas A. Loy, Ionomeric Poly(phenylene) Prepared by Diels-Alder Polymerization: Synthesis and Physical Properties of a Novel Polyelectrolyte, 2005 American Chemic Society, Published on Web May 12, 2005.

* cited by examiner

Primary Examiner—Mark Eashoo
Assistant Examiner—David Karst
(74) Attorney, Agent, or Firm—Robert D. Watson

(57) ABSTRACT

An epoxy-crosslinked sulfonated poly(phenylene) copolymer composition used as proton exchange membranes, methods of making the same, and their use as proton exchange membranes (PEM) in hydrogen fuel cells, direct methanol fuel cell, in electrode casting solutions and electrodes, and in sulfur dioxide electrolyzers. These improved membranes are tougher, have higher temperature capability, and lower $SO_2$ crossover rates.

9 Claims, 12 Drawing Sheets m = 0.99 to 0.01

R = H or SO₃H

EPOXY-CROSSLINKED SULFONATED POLY (PHENYLENE) COPOLYMER PROTON EXCHANGE MEMBRANES

FEDERALLY SPONSORED RESEARCH

The United States Government has rights in this invention pursuant to Department of Energy Contract No. DE-AC04-94AL85000 with Sandia Corporation.

CROSS-REFERENCE TO RELATED APPLICATIONS

None

BACKGROUND OF THE INVENTION

The present invention relates generally to sulfonated polymer compositions that are suitable in particular for producing polymer electrolyte membranes, electrodes and membrane electrode assemblies for use in fuel cells, in electrolysis cells, in dialysis equipment and in ultrafiltration and methods of synthesizing polymer compositions. More specifically, the present invention relates to innovative crosslinked sulfonated poly(phenylene) copolymers, methods of making the same, and their use as a proton exchange membrane (PEM) in hydrogen fuel cells, direct methanol fuel cell, in electrode casting solutions and electrodes, and in hybrid sulfur electrolyzers.

Polymer electrolyte fuel cells (PEFCs) have great potential as an environmentally friendly energy source. Fuel cells are electrochemical energy converters which feature in particular a high level of efficiency. Among the various types of fuel cells, PEFCs feature high power density and a low weight to power ratio. The PEFC uses as its electrolyte a polymer membrane.

Fuel cells are electrochemical cells in which a free energy change resulting from a fuel oxidation reaction is converted into electrical energy. Fuel cells are attractive electrical power sources, due to their higher energy efficiency and environmental compatibility compared to the internal combustion engine. The most well-known fuel cells are those using a gaseous fuel (such as hydrogen) with a gaseous oxidant (usually pure oxygen or atmospheric oxygen), and those fuel cells using direct feed organic fuels such as methanol.

The polymer electrolyte membrane or proton exchange membrane (PEM) is an important aspect of any PEFC. PEMs are an excellent conductor of hydrogen ions. The most widely used materials to date consist of a fluorocarbon polymer backbone, similar to Teflon®, to which are attached sulfonic acid groups. The acid molecules are fixed to the polymer and cannot "leak" out, but the protons on these acid groups are free to migrate through the membrane. With the solid polymer electrolyte, electrolyte loss is not an issue with regard to stack life. The potential power generated by a fuel cell stack depends on the number and size of the individual fuel cells that comprise the stack, and the surface area of the PEM.

In many fuel cells, the anode and/or cathode comprise a layer of electrically conductive, catalytically active particles (usually in a polymeric binder). A polymer electrolyte membrane is sandwiched between an anode and cathode, and the three components are sealed together to produce a single membrane electrode assembly (MEA). The anode and cathode are prepared by applying a small amount of a catalyst, for example, platinum (Pt) or ruthenium-platinum (Ru/Pt), in a polymeric binding to a surface that will be in contact with the PEM. Preparation of catalyst electrodes has traditionally been achieved by preparing an ink consisting of an electrocatalyst (either Pt or Ru/Pt), Nafion® polymer (5% wt. solution dispersed in lower alcohol). The ink is applied to porous carbon paper using a painting technique, or directly depositing the ink upon the membrane surface, or pressing it upon the membrane like a decal.

A MEA of a hydrogen fuel cell typically accepts hydrogen from a fuel gas stream that is consumed at the anode, yielding electrons to the anode and producing hydrogen ions, which enter the electrolyte. The polymer electrolyte membrane allows only the hydrogen ions to pass through it to the cathode while the electrons must travel along an external circuit to the cathode thereby creating an electrical current. At the cathode, oxygen combines with electrons from the cathode and hydrogen ions from the electrolyte to produce water. The water does not dissolve in the electrolyte and is, instead, rejected from the back of the cathode into the oxidant gas stream.

For the last 30 years the industry standard for the PEM component of a hydrogen or methanol fuel cell has been membranes based on fluorine-containing polymers, for example, the Nafion® material marketed by DuPont. Nafion® material is a perfluorinated sulfonic acid polymer having a well-known structure. Nafion® is often used as a membrane material for fuel cells, which operate at temperatures close to ambient. Further, Nafion® polymer membranes are hydrated and they have a hydrogen ionic conductivity of about $10^{-2}$ S/cm or higher.

The Nafion® membranes display adequate proton conductivity, chemical resistance, and mechanical strength. Some of the membrane's disadvantages are reduced conductivity at high temperatures (>80° C.), high methanol permeability in direct methanol fuel cells, relatively thick membranes, and membrane dehydration at high temperatures. Further, when Nafion® membranes are used at temperatures above 80° C., they thermally deform. This deformation of the membrane prevents the Nafion® membrane from coming into sufficient contact with the electrode, thereby reducing fuel cell performance. Additionally, there is a need to reduce the costs associated with such membranes.

Another limitation of Nafion® membranes occurs in applications in methanol fuel cells. Nafion® membranes are permeable to methanol. Methanol crossover is inversely proportional to membrane thickness. Direct transport of the fuel (i.e. methanol) across the membrane to the cathode results in losses in efficiency. Increasing the membrane thickness results in decreased methanol crossover. However, thicker membranes result in increased Ohmic losses and decreased fuel cell performance.

Membranes that decrease the rate of methanol crossover would allow the use of higher concentrations of methanol-water feed mixtures, which would increase catalyst efficiency, direct methanol fuel cell power output, and potentially fuel utilization.

In general, increasing the operation temperature of fuel cells is advantageous for several reasons. Higher operating temperatures in methanol fuel cells decrease the carbon monoxide poisoning of the electrocatalyst. Higher temperatures increase reaction kinetics of hydrogen oxidation on the anode and oxygen reduction on the cathode. However, as the temperature is increased, it becomes more difficult to keep the membrane hydrated. Dehydration of membranes is exacerbated by relatively thick membranes. Dehydrated membranes lose ionic conductivity and result in poor contact between fuel cell components due to shrinkage of the membrane. Therefore, improved performance of fuel cells could be achieved by reducing the thickness of membranes, and improving the humidification state of solid PEMs, since water molecules can promote proton transport and thin membranes can reduce ionic resistance and Ohmic losses.

Additionally, the contact between the membrane and electrode affects the efficiency of a fuel cell. Interfacial resistance between the membrane and electrode causes Ohmic loss thereby decreasing fuel cell efficiency. Improving the membrane-electrode contact and continuity, wherein the membrane and electrode are cast from a composition having the same or similar polymer electrolytes, would improve the membrane-electrode interfacial resistance.

What is needed are compositions from which improved polymer electrolyte membranes, electrodes, and electrode casting solutions can be made that have improved performance at temperatures at about 80° C. and above, and preferably above 120° C. Operating at these temperatures results in enhanced diffusion rates and reaction kinetics for methanol oxidation, oxygen reduction, and CO desorption thereby producing a more efficient fuel cell.

PEMs are also used in electrochemical reactors that generate hydrogen gas by the following reaction:

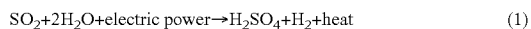

$$SO_2 + 2H_2O + \text{electric power} \rightarrow H_2SO_4 + H_2 + \text{heat} \quad (1)$$

This reaction can be part of the hybrid-sulfur thermochemical cycle in which the net reaction is the splitting of water. Reaction 1 can be performed in a membrane electrode assembly (i.e., electrolyzer), such as shown schematically in FIG. 1. Desirable features for an improved PEM material in such an electrolyzer application include: a) lower $SO_2$ crossover rates and/or higher conductivity, b) efficient water transport, and c) high temperature operation (e.g., $\geq 120°$ C.). These improved characteristics should help to achieve the goal of reducing cell overvoltage (enabling higher efficiency), lowering $SO_2$ crossover (for improved efficiency, and potentially durability), and providing more physically robust membrane structures to allow higher temperature operation if needed. PEMs that can readily operate above the melting point of sulfur (113-114° C.) could provide a method for sulfur removal, as well as enhance the kinetics of reaction at the electrolytic cell electrodes.

Previous sulfonated PEM membranes were synthesized at Sandia National Laboratories (SNL) for the DOE fuel cell program, and later patented (U.S. Pat. No. 7,301,002, which is incorporated herein by reference). These previous membrane materials, an example of which is shown in FIG. 2, were composed of a sulfonated poly(phenylene) compound that was prepared by a Diels-Alder reaction; and which will hereafter be referred to by the acronym SDAPP. The polymerization reaction to make the unsulfonated parent polymer is an irreversible Diels-Alder reaction that is responsible for forming every other phenyl ring in the backbone. Due to the ambiguous regiochemistry of the reaction, a mixture of 1,4 and 1,3-substituted rings are formed. The parent polymer is treated with a sulfonating agent to put sulfonic acid groups on the para-positions of some of the pendant phenyl rings ($R=SO_3H$ in FIG. 2). The number of sulfonic acid groups formed, and thus the ion exchange capacity (IEC), can be controlled by varying the amount of sulfonating agent used.

These previous SDAPP membranes were tested at SNL in an electrolysis cell as an alternative to Nafion® in a Hybrid-Sulfur (HyS) electrolyzer application. That test data, shown in FIG. 3, showed that these membranes could operate near 120° C., with somewhat reduced voltages (~0.7 volts), at a current density of about 0.43 amps/cm². For those tests, the cell conditions were: cell size=10 cm², cell potential=0.7 V, SDAPP 2.2 meq/g membrane batch, 2 mg Pt/cm² Pt Black anode and cathode, Dry $SO_2$ gas anode, 100 sccm constant $SO_2$ flow rate with 15 psig backpressure, and preheated liquid water cathode, 3 mL/min constant water flow rate with 15 psig backpressure.

The SDAPP family of membranes afford advantages over Nafion® membranes in temperature and transport capabilities. Based on previous SNL data, Nafion® membranes have approximately twice the undesirable $SO_2$ crossover rate (see FIG. 4) and generate nominally 30% lower outlet acid concentration, which could be a key process variable. FIG. 5 shows the $SO_2$ crossover effect measured in the SNL electrolysis cell for a 60 micron thick SDAPP membrane (SDAPP 2.2), and a 90 micron thick Nafion® 212 membrane (Lynntech MEA), as a function of temperature. The undesirable $SO_2$ crossover effect results in: a) process loss, b) parasitic $H_2$ consumption, and c) elemental sulfur buildup on the cathode, which blocks reaction sites. Note in FIG. 5 that the $SO_2$ flux to the cathode is lower for the SDAPP membrane, even though the SDAPP membrane is thinner.

Previous tests with SDAPP in the SNL hybrid-sulfur electrolyzer in 2007 showed that the cell current increased as the cell temperature was raised (at a constant voltage) from 80 to 120° C. As the temperature was raised above 120° C., however, the current began to decrease, presumably due to an increase in the resistance of the membrane. This increase in membrane resistance is believed to be due to a change in the membrane morphology. At lower temperatures ($\leq 120°$ C.), the polymer chains that compose the membrane are phase separated into microdomains that are either hydrophilic or hydrophobic. The size and interconnectivity of the hydrophilic domains determine the water swelling and ionic conductivity of the membrane. At temperatures above 120° C., the microstructure undergoes a change and the ion-conducting channels within the membrane are disrupted, thereby increasing resistance.

Therefore, the approach taken in the present invention was to crosslink the polymers in order to "lock in" the desired morphology and prevent it from changing at higher temperatures. Crosslinking limits the ability of the membranes to swell, and the lower water content could reduce the ionic conductivity. Crosslinking will also allow for the density of ionic functional groups (sulfonic acids in this case) to be increased (higher IEC) without causing the membranes to swell too much or even become soluble in water. The increased IEC values could lead to membranes with higher conductivities than those for the membranes that are not crosslinked, despite their lower water swelling.

SUMMARY OF THE INVENTION

The present invention relates to an epoxy-crosslinked sulfonated poly(phenylene) copolymer composition used as proton exchange membranes, methods of making the same, and their use as proton exchange membranes (PEM) in hydrogen fuel cells, direct methanol fuel cell, in electrode casting solutions and electrodes, and in sulfur dioxide electrolyzers. These improved membranes are tougher, have higher temperature capability, and lower $SO_2$ crossover rates.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

Figure 1:
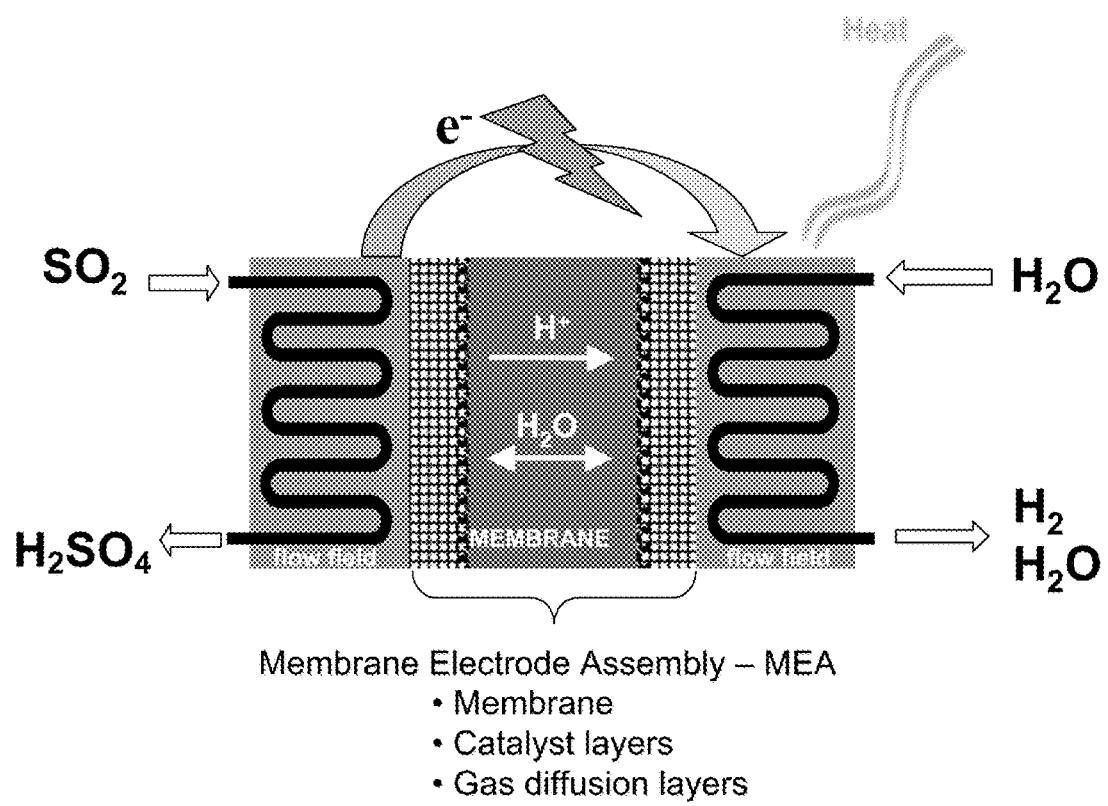
FIG. 1 shows a schematic membrane electrode assembly of a sulfur dioxide electrolyzer.
Figure 2:
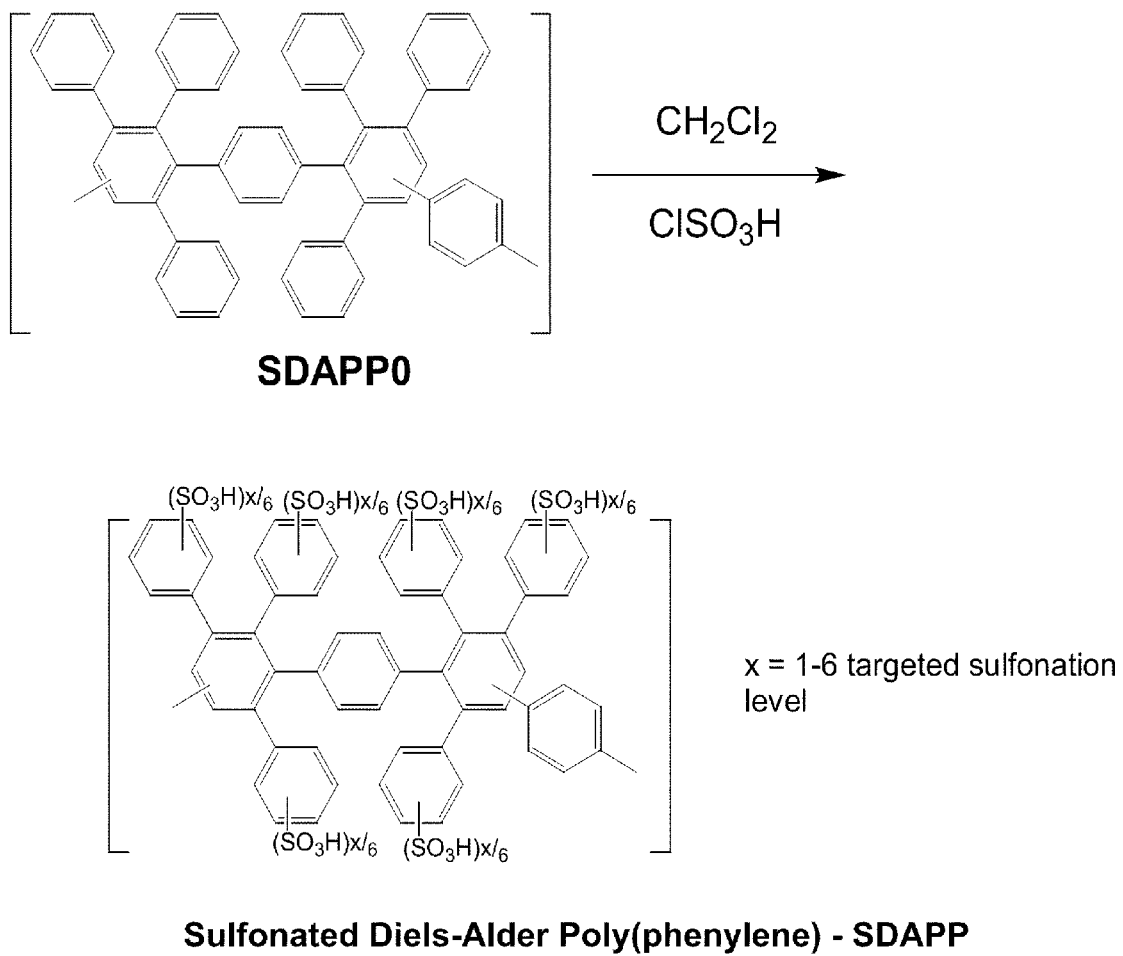
FIG. 2 shows the structure of a sulfonated Diels-Alder poly(phenylene) polymer (SDAPP).
Figure 3:
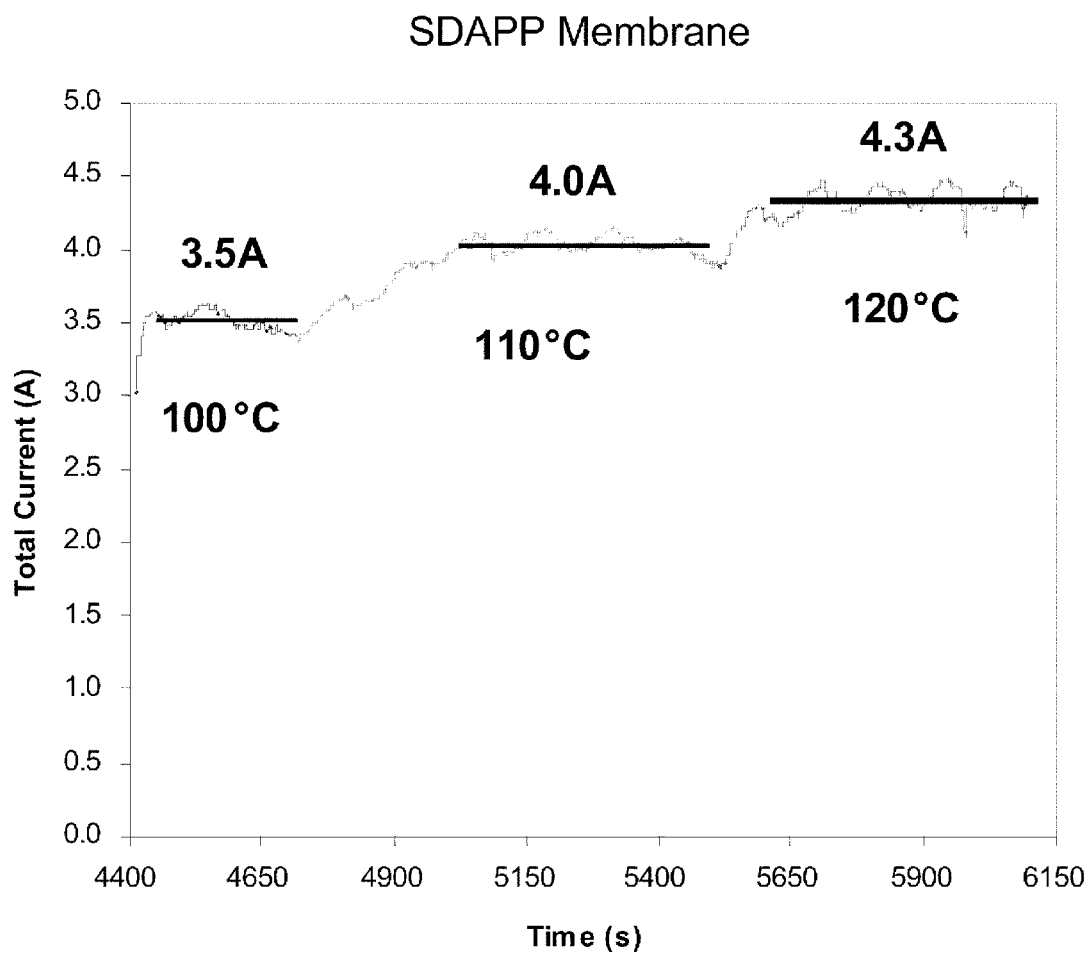
FIG. 3 shows a plot of total current versus time for a SDAPP membrane.
Figure 4:
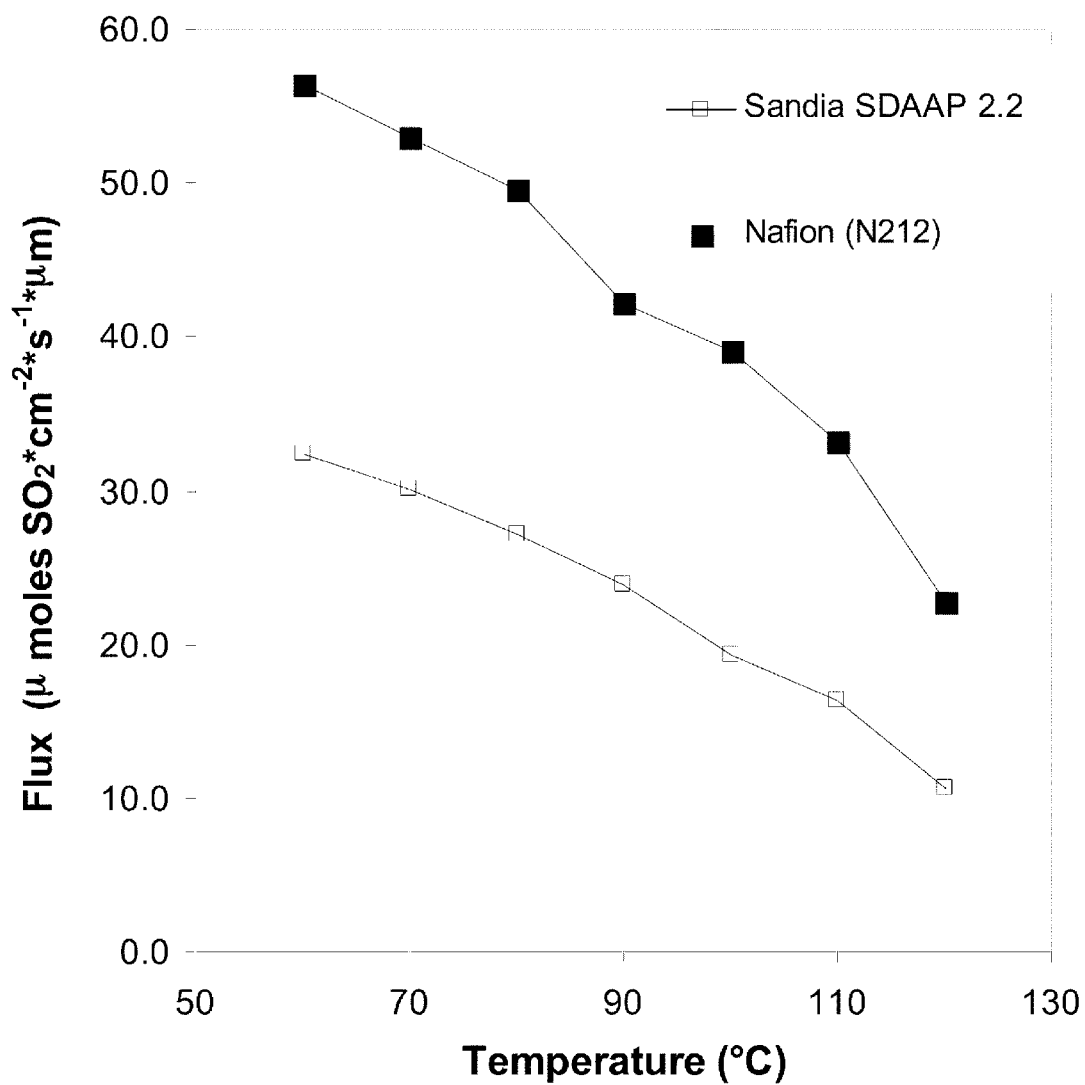
FIG. 4 shows a plot of $SO_2$ flux versus temperature.
Figure 5:
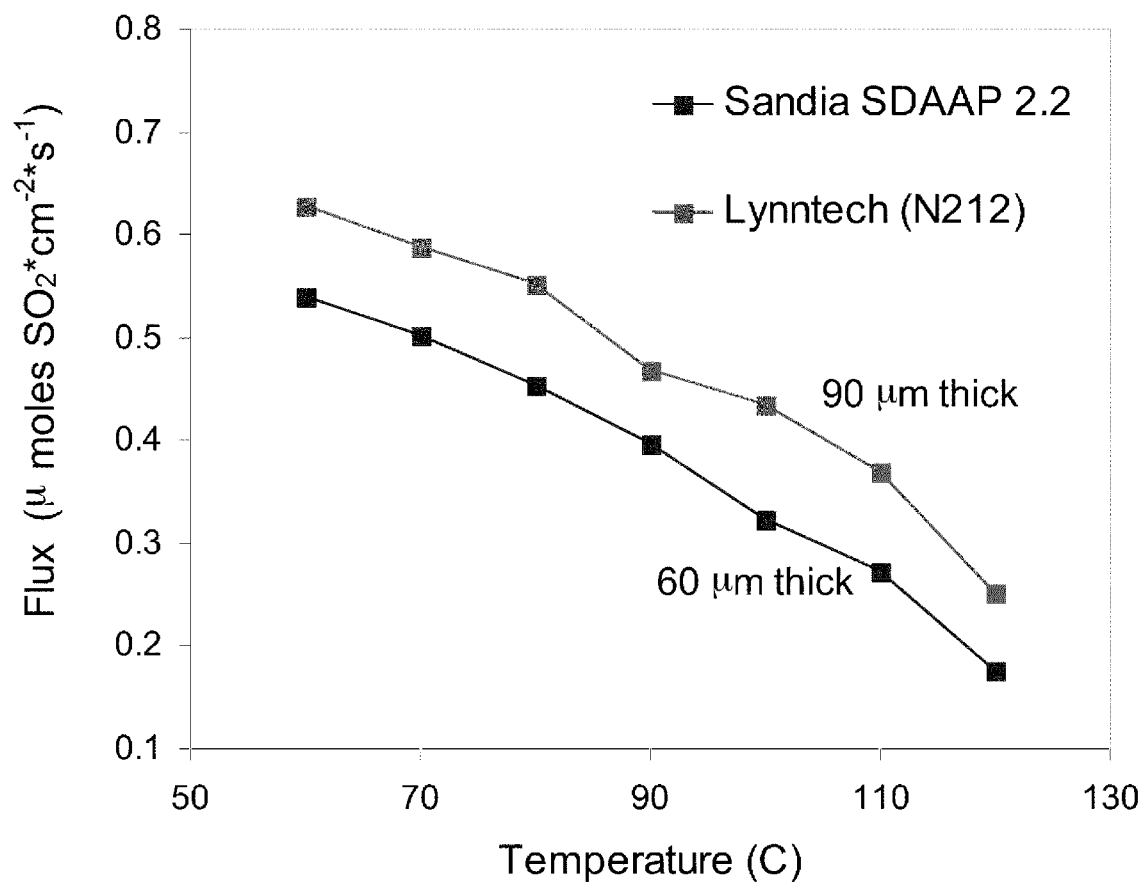
FIG. 5 shows a plot of $SO_2$ flux versus temperature.

For ease of explanation, the present invention is explained in terms of Diels Alder poly(phenylene) polymer compositions (DAPP), sulfonated Diels Alder poly(phenylene) polymer compositions (SDAPP), and epoxy-crosslinked sulfonated Diels Alder poly(phenylene) polymer compositions (EXSDAPP).

The poly(phenylene) repeat units of Structure I is polymerized to form poly(phenylene) polymers of between about 130-300 repeat units. Structure I is synthesized by various methods, including Diels Alder reactions for example where bis-tretraphenylcyclopetadienone reacts with p-Bis(ethynyl) benzene to yield carbon monoxide and polyphenylene. Alternatively poly(phenylene) and carbon dioxide are produced by the condensation of 2-pyrone with p-Bis(ethynyl)benzene.

Structure I

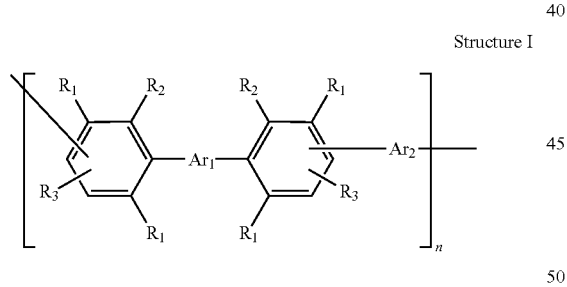

The repeat unit contains $R_1$, $R_2$ and $R_3$ which are the same or different, wherein each $R_1$, $R_2$ and $R_3$ is H or an unsubstituted or inertly-substituted aromatic moiety. $Ar_1$ represents an unsubstituted or inertly substituted aromatic moiety. $Ar_2$ represents an unsubstituted or inertly substituted aromatic moiety. Aromatic moiety includes phenyl polyaromatic and fused aromatic moieties that can be unsubstituted or inertly-substituted and include:

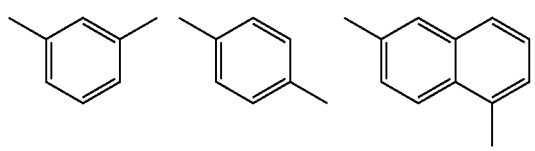

-continued

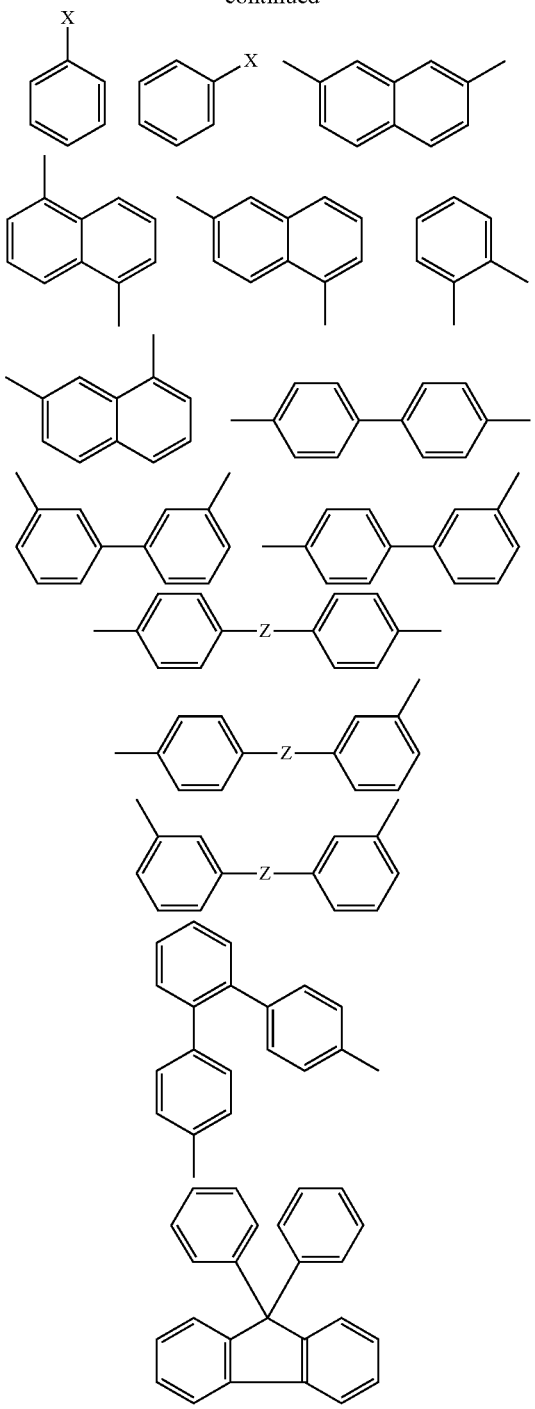

each Z is selected from —O—, —S—, alkylene, —$CF_2$—, —$CH_2$—, —O—$CF_2$—, perfluoroalkyl, perfluoroalkoxy,

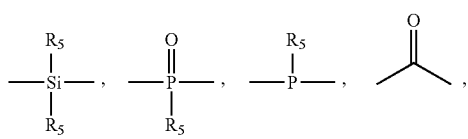

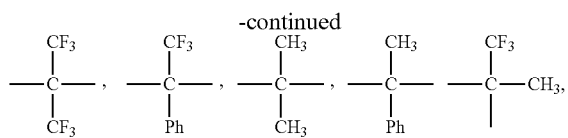

where $R_5$ may be —H, $CH_3$, —$CH_2CH_3$, —$(CH_2)CH_3$ or Ph, (where Ph is phenyl). Substituent groups that do not react under Diels Alder polymerization conditions and under casting film conditions define inert substitution. Functional groups include but are not restricted to x=$CH_3$, $CEt_3$, $CCH_3$, $CF_3$, $NMe_2$, $NH_2$, F, Cl, Br, $OCH_3$, OH, $OCF_3$, O-Ph, Ph, and $SO_3R_5$.

For example, synthesis of DAPPs are performed using a modification of the method known in the art wherein to bis-tetracyclone (50.0 g; 72.4 mmol) and 1,4-diethynylbenzene (9.13 g; 72.4 mmol) in a 500 mL Schlenk flask, diphenyl ether (250 mL) is added and the resulting mixture is frozen in an ice bath. The mixture is freeze-thaw degassed (3×) before heating under argon (1 atm) at 180° C. for 24 h. Periodically, carbon monoxide is vented to avoid over-pressurization of the reaction flask. Subsequently, additional diethynylbenzene (0.10 g; 0.8 mmol) is added to the viscous slurry and the mixture is stirred for an additional 12 h at 180° C. The reaction vessel is then cooled to room temperature and its contents are diluted with toluene (300 mL). The polymer is precipitated by drop-wise addition of the solution to 1000 mL of acetone. This dilution in toluene and precipitation in acetone is repeated and the resultant white solid is dried in a vacuum oven for 12 h at 80° C., 48 h at 230° C., and 24 h at room temperature. A 96% yield (52 g collected) of a tough, yellow solid is obtained. According to one embodiment of the present invention, the DAPP polymer is polymerized in the absence of a metal catalyst.

In one example of a sulfonation, DAPP (7.02 g) is added to a flame dried, 500 mL three-neck, round-bottom flask under argon and dissolved in methylene chloride (6% solution by weight). The solution is cooled to −50° C. (dry ice/acetonitrile) and chlorosulfonic acid (4.30 g, 36.9 mmol) (diluted in chloroform 20 mL) is added dropwise though an addition funnel over 15 minutes while being vigorously stirred with a mechanical stirrer under an argon atmosphere. This amount of chlorosulfonic acid gives a 4:1 ratio of acid to polymer repeat unit. Other ratios of sulfonating agent to polymer repeat unit are prepared to attain polymers with various ion exchange capacities. A mixture darkened from bright yellow to black during chlorosulfonic acid addition. After 30 minutes the reaction is warmed to room temperature at which point a dark solid precipitated. The organic solvent was decanted and to the remaining solid was added 300 mL of a 0.5 M solution of NaOH that was allowed to react at room temperature for 12 h. The slurry is then heated for 4 h at 80° C. to ensure sulfonyl chloride conversion. The off-white solid was Soxhlet extracted with de-ionized water for 48 h and dried in a vacuum oven at 100° C. for 48 h to obtain light yellow solid (9.52 g). $_1$H NMR (d-DMSO): δ(ppm)=broad signal 6.35-7.22 (peaks at 7.19, 7.09, 6.95, 6.88, 6.64, 6.54). $_{13}$C NMR (DMSO-$d_6$): δ (ppm)=broad signal 138-141 (peak at 139) broad signal 131-126 (peaks at 126.9, 128.7, 129.5, 131.0).

The sodium salt of the sulfonated polymer is dissolved in DMAc (10% weight solution) and filtered though a 2 μm syringe filter (glass microfiber filter). The solution is cast onto a clean glass plate in an oven at 90° C. under $N_2$. After 20 h, the film is removed from the glass plate and immersed in de-ionized water (1 L, 18 M.) for one hour at 100° C. to extract any residual DMAc. The resultant film is then converted into the acid (proton) form by immersion in 2.0 M $H_2SO_4$ at 100° C. for one hour. The film is then rinsed thoroughly with de-ionized water and then soaked in deionized water (18 M.) at 100° C. for another hour to remove any residual acid. The films are stored in de-ionized water until used.

According to one embodiment of the present invention, a 6 wt % polymer solution of DAPP in methylene chloride is homogeneously sulfonated in situ with chlorosulfonic acid. Sulfonating agents include sulfuric acid, fuming sulfuric acid and sulfur trioxide, or a mixture of sulfuric acid and thionyl chloride but are not limited thereto.

Activation of the poly(phenylene)(s) for proton conductivity is accomplished by using a variety of activating agents. The degree of sulfonation and the homogeneity of sulfonation between repeat units are controlled by varying the concentration of the sulfonating agent, varying the temperature of the reaction and whether a poly(phenylene) polymer is dissolved at the time of sulfonation. Pendant side chains of sulfonyl groups are attached to a carbon atom of the lateral phenyl ring. According to one embodiment of the present invention, the attachment of the pendant groups are at the para position from attachment to the backbone. According to yet another embodiment of the present invention, the attachment of the pendant groups are at the meta position from attachment to the backbone.

Example I

One method for sulfonating a polyphenyl backbone with the illustrative parent polyphenylene structure is illustrated in scheme 1:

Scheme 1

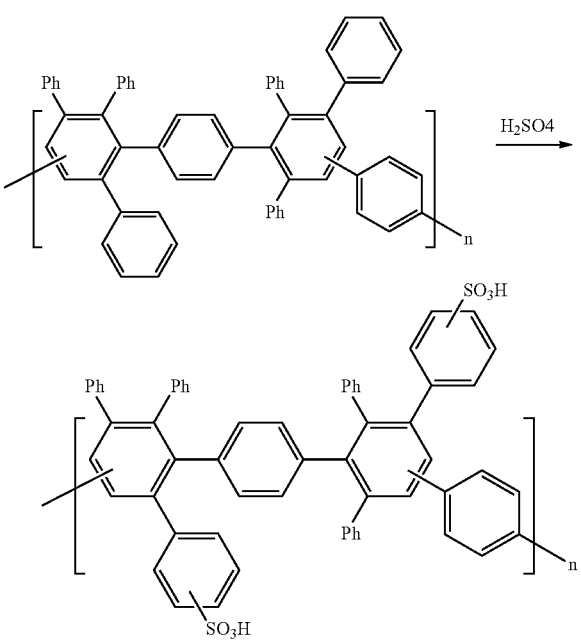

The sulfonating agent is added to solid polyphenylene polymer. The ratio of acid to polymer repeat unit is varied to yield polymers with various ion exchange capacities. Examples of sulfonating agents include sulfuric acid, fuming sulfuric acid, sulfur trioxide but are not limited thereto. Use of this method can result in inhomogenous sulfonation since only the face of the polymer is in contact with the sulfonating agent. Alternatively, sulfonation can proceed by dissolving the polymer in a chlorinated hydrocarbon, followed by the addition of the sulfonating agent. This results in sulfonation that occurs homogenously through the polymer backbone since each repeat group has an equal probability of reacting with the sulfonating agent. Chlorosulfonic acid sulfonation at elevated temperatures results in a homogenous sulfonation of each polymer unit. Varying the concentration of the sulfonating agent varies the degree of sulfonic acid pendant groups per polymer repeat unit.

Poly(phenylenes) that are not 100% sulfonated are soluble in a variety of polar, aprotic solvents such as as N,N-Dimethylacetamide (DMAC), dimethylformamide (DMF), dimethylsulfoxide (DMSO) and N-Methylpyrrolidone (NMP). Fully sulfonated polyphenylenes are at least partially insoluble in a variety of polar, aprotic solvents such as DMAC, DMF, DMSO and NMP and as such can form a hydrogel. The sulfonated polyphenylenes hydrogels are useful as ion exchange resins for desalination of water and chelation of inorganic materials that would exchange into the hydrogel.

The degree of sulfonation per repeat polymer unit is controlled by the concentration of sulfonating agent. Manipulation of temperature and concentration of the sulfonating agent yields sulfonated polyphenylene polymer compositions having morphology that allows for increased ion exchange capacity, membrane hydration, improved physical properties at temperatures above 80° C. and limited methanol (MeOH) fuel crossover when compared to Nafion® compositions.

A DAPP and SDAPP backbone structure provides decreased segmental mobility thereby producing a relatively stiff backbone structure or rod-like structure. The sulfonic acid pendant groups are distributed throughout the polymer. The overall morphology of the SDAPP provides for a rod-like structure wherein the acid groups form proton channels. The rod-like structure of the DAPP and SDAPP contributes to the improved water retention properties of the materials, the decreased low-carbon fuel permeability and the improved conductance thereby leading to increased fuel cell efficiency over that of Nafion®117 materials.

According to one embodiment of the present invention films are cast upon a clean glass surface from about a 20 wt % solution of polymer. The surface of the glass can be coated with hydrophobic groups. The resulting film is transparent and flexible.

According to another embodiment of the present invention films are treated with $H_2SO_4$ for about 24 hours. The treated films are bathed in a bath of deionized water for about 24 hours to remove any inorganic salts. The treated films are further treated to $H_2SO_4$ at about 100° C. for about one hour. Inorganic salts deposited on the films are removed by bathing the films in deionized water at about 100° C. for about 1 hour. In an alternative embodiment the second wash step is omitted.

Electrochemical Impedance Spectroscopy (EIS) was used to collect proton conductivity data for polyphenylene polymer materials and sulfonated polyphenylene polymer material. Films are measured by four probe EIS using a Solartron 1260 frequency analyzer and a Solartron 1287 potentiostat and a test cell designed to measure the materials impedance by the point method. The resistance of each film was measured while totally submerged in deionized-water during each measurement at 25° C. Proton conductivity was calculated using Eq. 1:

$$\Sigma = d/(A \cdot R) \qquad \text{Eq. 1}$$

where d is the electrode distance (0.5 cm), A is the cross sectional area of the film, and R is the film resistance. The conductivities are determined in hydrated films by AC impedance spectroscopy over a frequency range of $1 \times 10^3$ Hz to $1 \times 10^6$ Hz.

Solid-State Sulfonation

In the present invention, a completely new method of sulfonation was developed, wherein the membranes were sulfonated in the solid state by immersing the crosslinked and partially sulfonated membranes in a solution of TMSCS in dichloromethane. This technique cannot be used for uncrosslinked SDAPP because the membrane would begin to dissolve as soon as it was immersed in the sulfonating solution. However it works quite well with the epoxy-crosslinked membranes. By adjusting the concentration of TMSCS in dichloromethane, the membrane properties can be varied greatly. For example, lines 2-7 in Table 3 are all samples that were prepared by increasing the sulfonation level of the sample from line 1. In this case, a membrane with an IEC of 1.91 was converted to several with IECs ranging from 2.12 to 3.92 (while the water uptake was increased from 44% to as high as 907%). A useful range of concentrations of TMSCS in dichloromethane is 0.25 to 1.5 weight percent. Other useful solvents can be used in place of dichloromethane, for example chloroform, carbon tetrachloride, chlorobenzene, or 1,1,2,2-tetrachloroethane.

Lines 8-11 in Table 3 represent a second set of membranes all prepared from the same starting membrane via the solid-state sulfonation technique. Of particular interest is 6-87-F (line 10) which has a conductivity of 183 mS/cm and an IEC of 3.05, since uncrosslinked SDAPP with the same IEC level would be expected to have a water uptake of several hundred percent and would swell so much that it would tear apart easily (6-87-F does not). All the entries in Table 3 show a positive correlation between IEC, water uptake, and conductivity. The only exceptions to this are lines 2 and 3, which have the highest IEC and water uptake values yet they do not have the highest conductivities. This is believed to be because the water uptakes are so high that the density of the ion-conducting functional groups (the sulfonic acid groups) is decreased such that movement of ions through these membranes is hindered.

Thermal Cross-Linking

Figure 6:
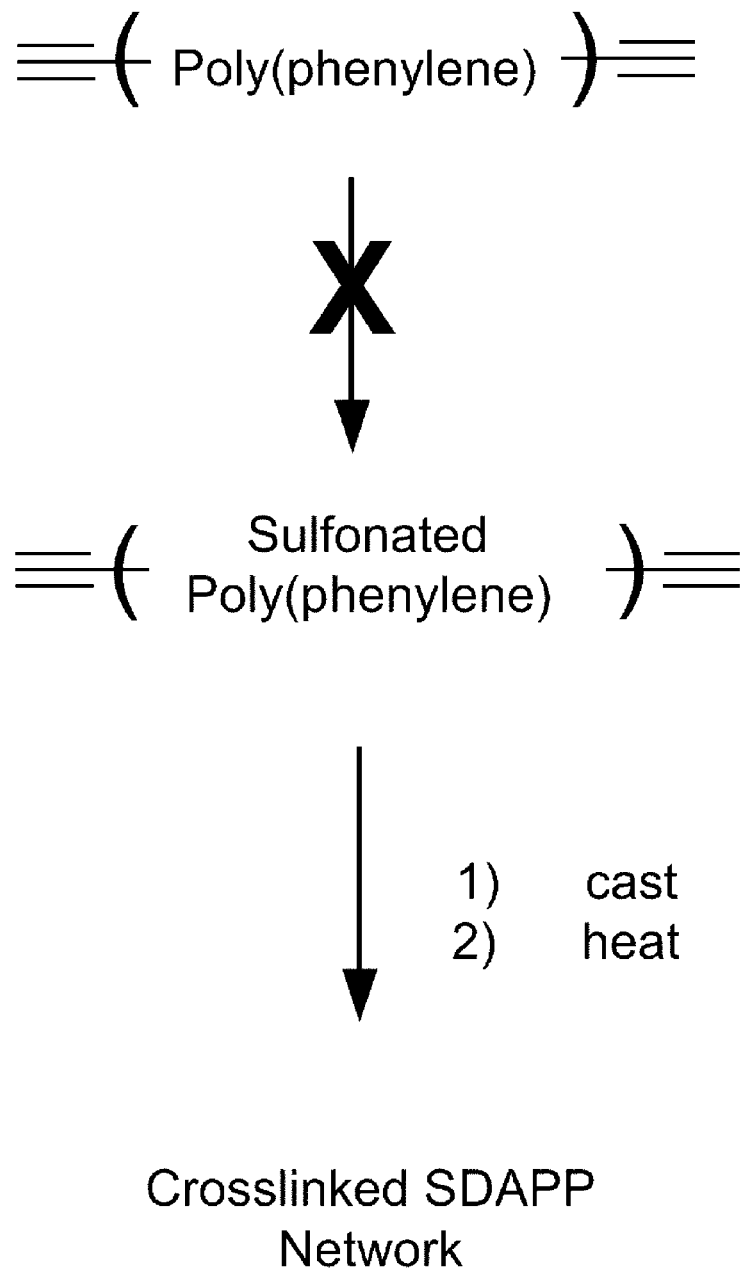
FIG. 6 shows a method of synthesizing a crosslinked SDAPP network.

Initial efforts to prepare crosslinked membranes focused on making oligomers with reactive ethynyl or allylic end groups. The oligomers were then sulfonated and cast into films from dimethyacetamide (DMAc) solution according to the usual procedure for making SDAPP. The membranes were then cured at high temperature or exposed to UV radiation to cause the endgroups to crosslink (FIG. 6). However, the resulting membranes were not crosslinked, as evidenced by the fact that they could be completely redissolved in DMAc. The cause was determined to be the premature reaction of the end groups with the sulfonating agent, so that there were no reactive end groups to form crosslinks.

Figure 7:
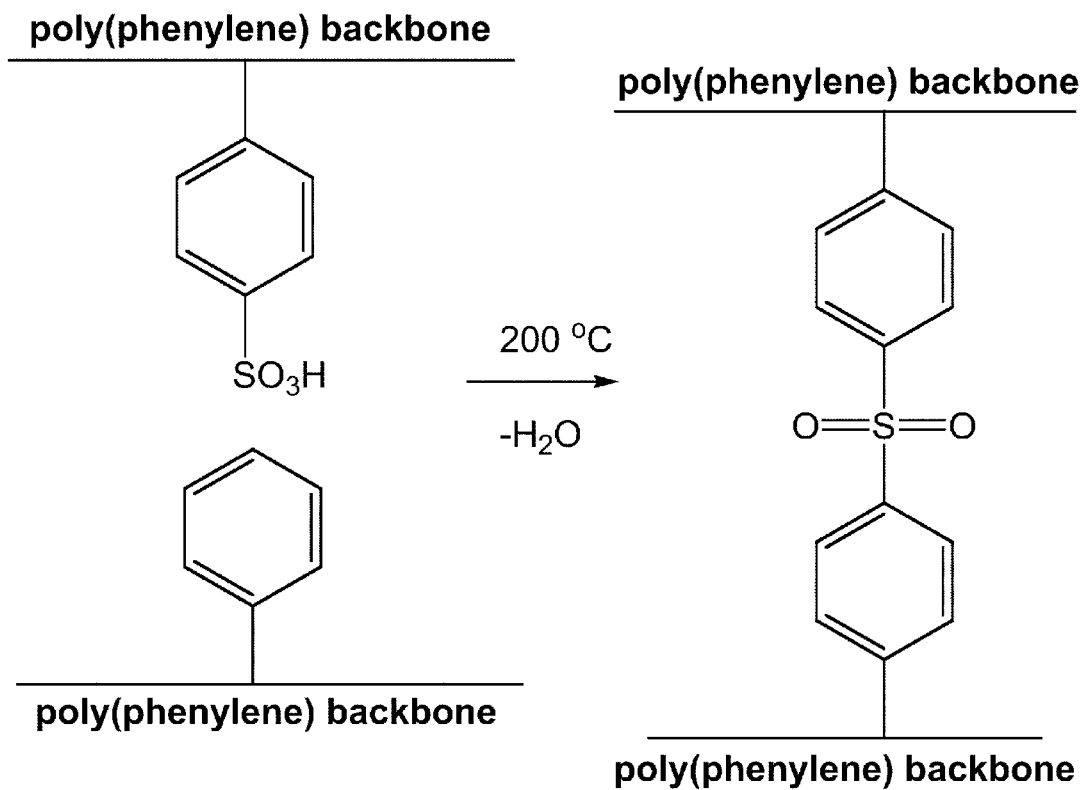
FIG. 7 shows a crosslinking reaction.

The second method to crosslink the membranes did not require any changes in the SDAPP synthesis except that the sulfonated polymer was converted to its acid (protonated) form prior to casting the membrane (previously, the sodium salt form had been used for casting). After casting, the acidic membrane was cured at 180-200° C. for 2-6 hours. The resulting membranes did show evidence of crosslinking (attempts to redissolve the membranes in DMAc resulted in partial solutions with numerous gel particles in suspension). When the same curing technique was tried with a salt form membrane, no crosslinking occurred. The mechanism of crosslinking was therefore determined to be a condensation reaction between a sulfonic acid group and a phenyl ring, resulting in a sulfone crosslink and the loss of a water molecule, as shown in FIG. 7.

At the time this thermal crosslinking method was developed, the SDAPP membranes had always been prepared by sulfonating the parent polymer in a solution reaction with chlorosulfonic acid (CSA) as the sulfonating agent. The maximum achievable IEC with this technique was about 2.6 meq/g. Any attempts to sulfonate at a higher level (by using more CSA) resulted in a polymer that was insoluble and could not be cast. Previously, this had not been a problem since the uncrosslinked membranes would swell too much in water if the IEC was higher than 2.6. Since crosslinking provided a way to reduce water uptake and control swelling, several new sulfonation techniques were tried, and ultimately a method utilizing trimethylsilyl chlorosulfone (TMSCS) was found to be capable of producing membranes with IEC values as high as 3.8 meq/g.

Several membranes with IECs between 2.6 and 3.5 meq/g were prepared and crosslinked using the acid form/thermal curing technique. Despite the crosslinking, many of these high IEC membranes had water uptakes of greater than 150%. The high water content made some of the membranes too mechanically weak to process into MEAs. Table 1 lists the membranes samples that were prepared by the thermal crosslinking method and some of their characterization data. In general, the IEC and water uptake values decrease as a result of the curing process, which is in agreement with the mechanism shown in FIG. 7. However, the decrease in IEC is usually very small, indicating that relatively few crosslinks were formed.

In the example with the largest decrease in IEC value (6-64-J), which would seem to indicate the highest degree of crosslinking, the final water uptake is still very high (239%). In those cases where the final water uptake is higher than the initial water uptake, the differences are small and are assumed to be due to error in the measurements.

Several of the thermally crosslinked membranes were tested in the $SO_2$ electrolyzer. The $SO_2$ electrolysis test results and some of the membrane properties are listed in Table 2. Lines 1-3 all show data for SDAPP that has not been crosslinked. It is important to note that thinner membranes have a lower total resistance and therefore give better cell performance; however, they are less durable and more prone to failure. It has been found that SDAPP membranes around 50 microns in thickness (line 2 in Table 2) provide sufficient durability while providing reasonable current output. SDAPP membranes much below 50 microns thickness do not have sufficient durability for practical application to the hybrid sulfur membrane endeavor. While the results for the uncrosslinked membrane listed in line 1 of Table 2 are superior to every other entry in Table 2, the thin membrane used does not have the required durability. The data in line 1 is included merely to illustrate the dependence of the cell performance on membrane thickness.

The results for the first set of thermally crosslinked membranes (lines 4-6) showed that the total current outputs at all temperatures were lower than those achieved with the original (not crosslinked) SDAPP membranes of comparable thickness (lines 1-3). The test results on line 6 show that the current drop with increased temperature was very small, but the SDAPP membrane with similar thickness (line 3) also showed a constant (and slightly higher) current output, so this first set of crosslinked membranes did not show any improvement over SDAPP. Two of the membranes with higher IECs (lines 7-8) did show considerable improvement over SDAPP with similar thickness (line 3). The currents are higher at all temperatures and they are stable at the higher temperatures. It seems likely that if these two membranes could be prepared with a thickness of 50 microns, they would be able to outperform the SDAPP in line 2. However, these two membranes both had water uptakes of about 125% and were not mechanically tough enough to be processed into MEAs at lower thicknesses. The membrane used in line 9 had a very high IEC and consequently a very high water uptake (239%) which had the effect of lowering the density of the ionic groups (charge carriers) and thus decreasing the conductivity of the membrane. These results indicated that the density of the crosslinks within the membranes needed to be increased in order to better limit the water uptake and improve mechanical stability.

Epoxy Cross-Linking

Figure 8:
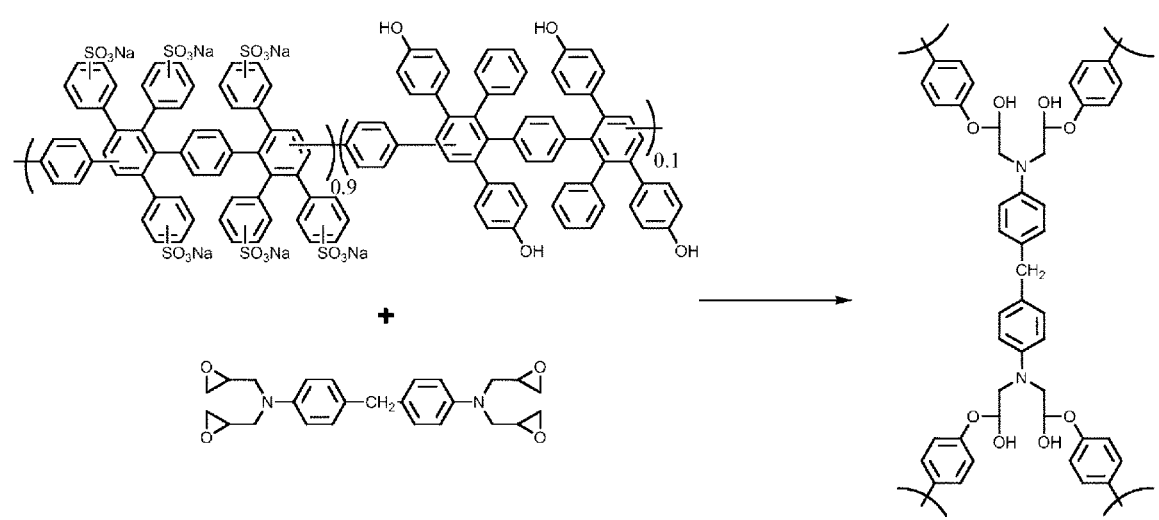
FIG. 8 shows a method of synthesizing epoxy-crosslinked SDAPP-OHDAPP copolymer.

The improved synthesis method of the present invention allows better control of the density of the crosslinks by using a tetra-epoxy crosslinking agent and a polymer that was modified with hydroxyl groups that could react with the epoxy (see FIG. 8). This method requires the synthesis of an SDAPP copolymer in which, for example, 10% of the repeat units have hydroxyl functional groups. This in turn, required the synthesis of a new monomer with methoxy functional groups. After polymerization, the copolymer was treated with boron tribromide to convert the methoxy groups into hydroxyl groups. The copolymer could then be sulfonated using TMSCS to attain membranes with IEC values up to 1.94. Any attempts to sulfonate at a higher level (by using more TMSCS) resulted in a polymer that was insoluble and could not be cast. To cast membranes of the sulfonated copolymers, they were dissolved in DMAc along with the tetra-epoxy crosslinking agent. After casting under vacuum at 80° C., the membranes were cured at 150° C. to allow the crosslinking reaction to take place. The amount of crosslinking agent added was calculated based on adding 2.1 epoxy moieties per hydroxyl group. This number is rather arbitrary and a full investigation of these membranes would require varying this ratio, as well as the curing conditions to find the optimum conditions. For the membranes presented in this specification, the epoxy/hydroxy ratio and the curing conditions were held constant. Most of the OH groups should have reacted with the crosslinking agent.

Alternatively, the ratio of crosslinking agent to the number of reactive sites on the polymer can be varied, as discussed above. The ratio can vary between 1 to 4 epoxy groups per hydroxy group.

The improved synthesis process involves crosslinking SDAPP with a tetrafunctional reagent. The copolymer contains reactive hydroxyl groups. The copolymer and tetra-epoxide reagent are dissolved together in DMAc for casting. After casting, the membrane is cured at 150° C. for 90 minutes. This method allows for greater control over crosslink density through copolymer composition, reaction stoichiometry, and curing conditions.

These new membranes can be prepared with a high ion exchange capacity (for high conductivity) but can also be crosslinked fairly tightly to prevent them from swelling too much or dissolving. Unlike the thermally crosslinked membranes, the epoxy crosslinked membranes (EXSDAPP) do not give a partial (gelatinous) solution when immersed in DMAc, rather, they show some signs of swelling while retaining their shape.

When the crosslinks are formed, the sulfonic acid groups are all in their neutralized, sodium salt form. However, before the membrane is actually used in an $SO_2$ electrolyzer, it is soaked in aqueous acid to convert the sulfonic acid groups back to their acid form ($—SO_3H$ instead of $—SO_3Na$).

Example 2

Example 2 is an epoxy-crosslinked sulfonated DAPP copolymer composition having Structure II:

Structure II
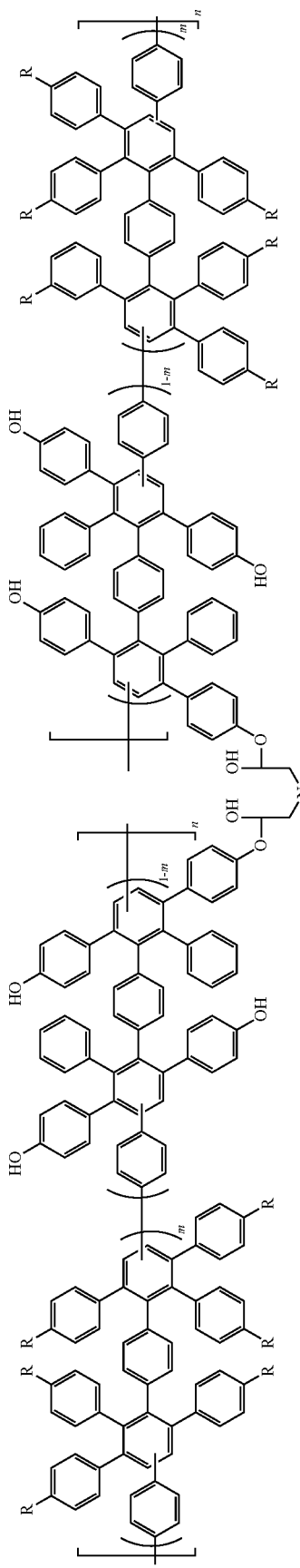
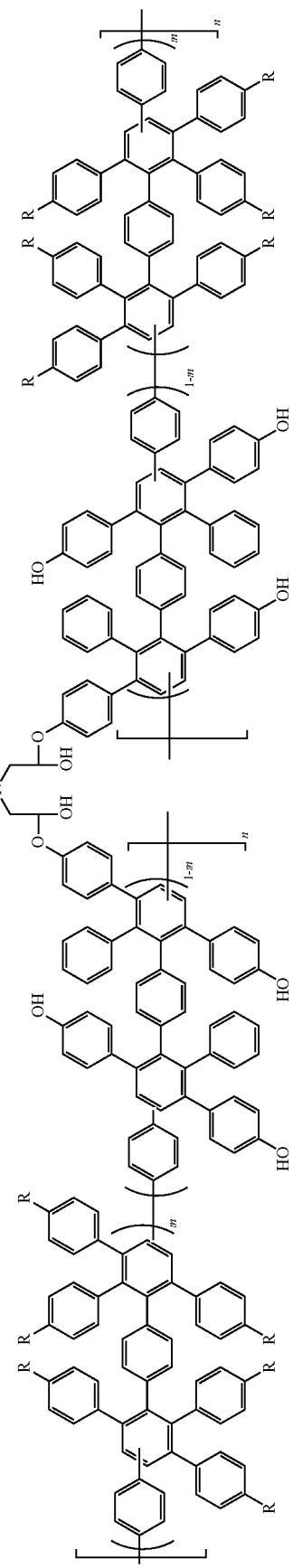

In structure II, the parameter m can range from 0.01 to 0.99. Preferably m=0.9. R can be H or SO$_3$H. For the range of membranes that we have prepared, the number of sulfonic acid groups per polymer repeat unit has ranged from about 1.5 to 5. In other words, this means that about 25% to 83% of the R groups in FIG. 11 can be —SO$_3$H groups. The number of copolymer repeat units, n, is greater than or equal to 2, and can range from 100 to 300, or greater.

The synthesis process used to make Example 2 comprises six main steps:
 a) synthesis of tetramethoxy bis(cyclopentadienone) (MeOCPD);
 b) synthesis of DAPP-MeODAPP copolymers;
 c) demethylation of DAPP-MeODAPP copolymers to make DAPP-OHDAPP copolymer;
 d) solution sulfonation of DAPP-OHDAPP;
 e) casting and crosslinking of films; and
 f) solid state sulfonation of crosslinked films.

Figure 9:
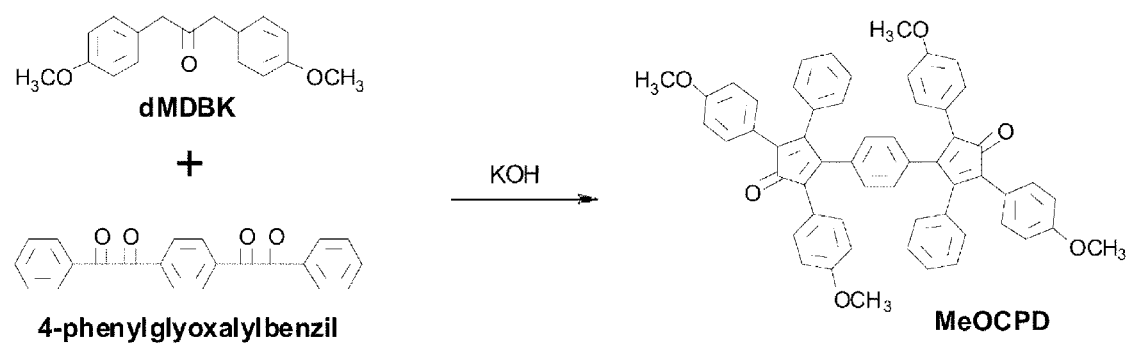
FIG. 9 shows a method of synthesizing MeOCPD.
Figure 10:
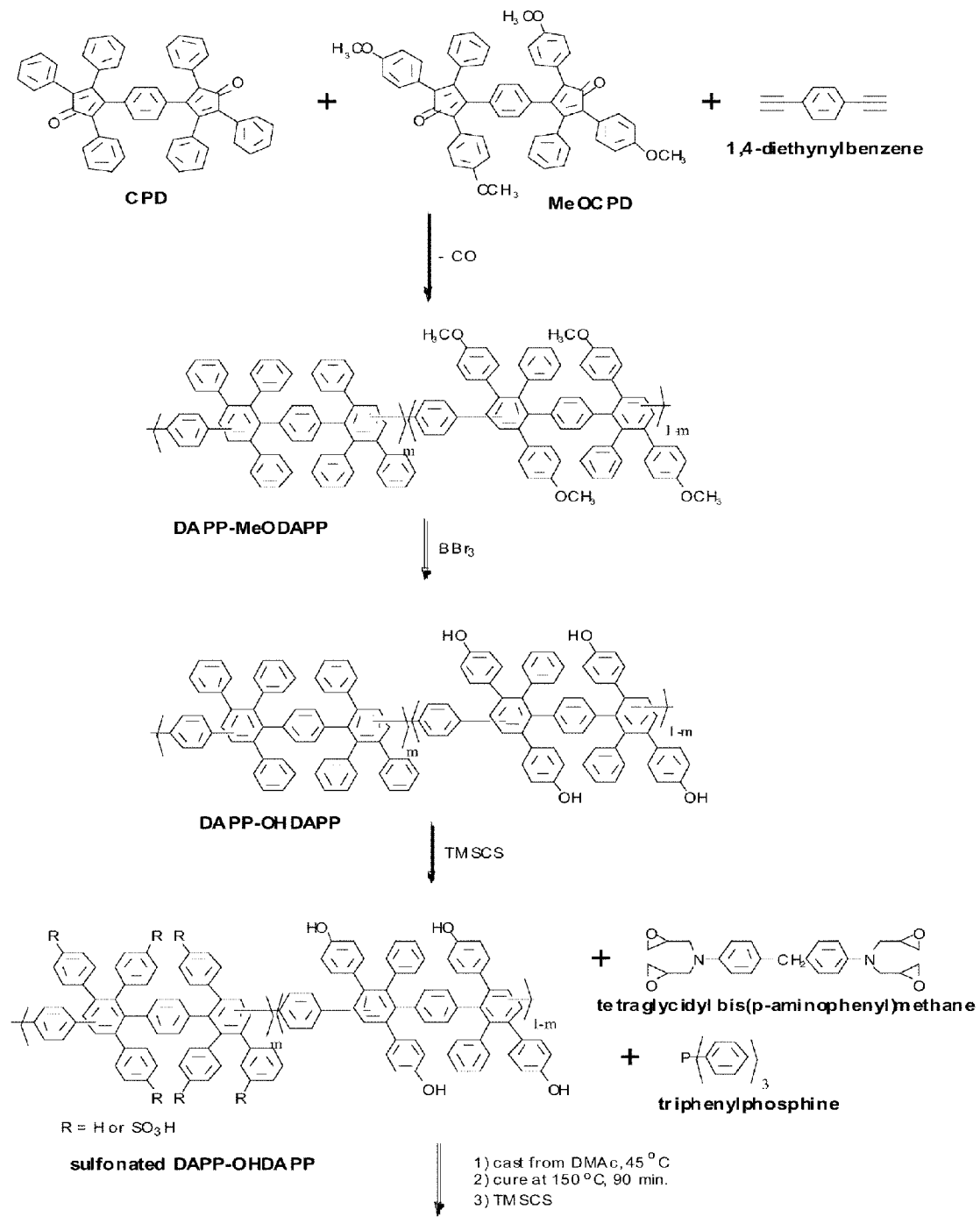
FIG. 10 shows a method of synthesizing epoxy-crosslinked SDAPP-OHDAPP copolymer.
Figure 11:
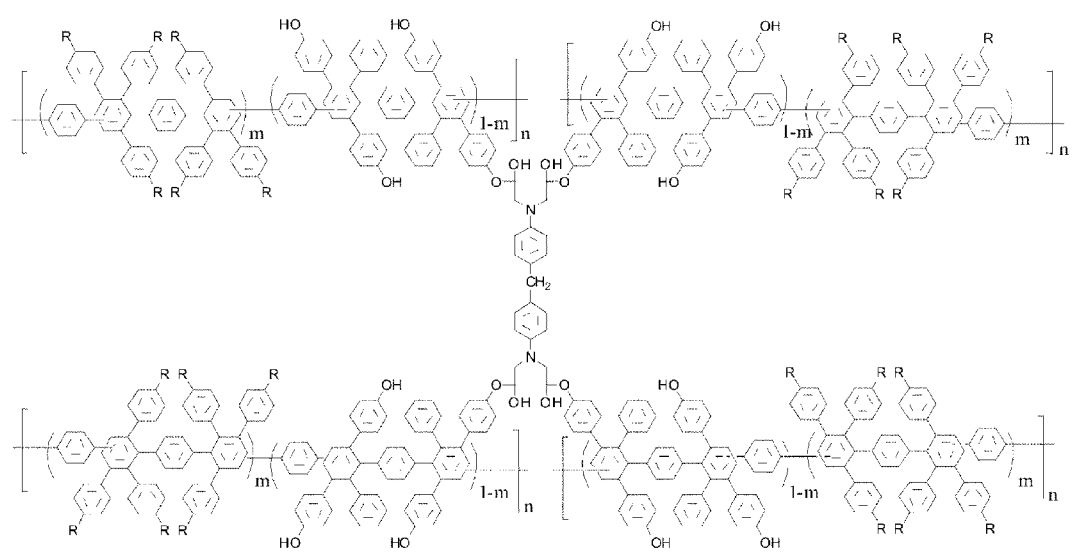
FIG. 11 shows the final structure of epoxy-crosslinked SDAPP-OHDAPP copolymer.

These steps are illustrated in FIGS. 9, 10, and 11. All reagents were purchased from commercial vendors and used without further purification unless specified. 1,4-Diethynylbenzene was recrystallized from ethanol and dried under vacuum prior to use.

These steps, in more detail, are:

a) Synthesis of tetramethoxy bis(cyclopentadienone) (MeOCPD)

First, we needed a new monomer having methoxy functional groups. So, we developed a new class of compounds: "tetramethoxy bis(cyclopentadienone)", which we have abbreviated as MeOCPD.

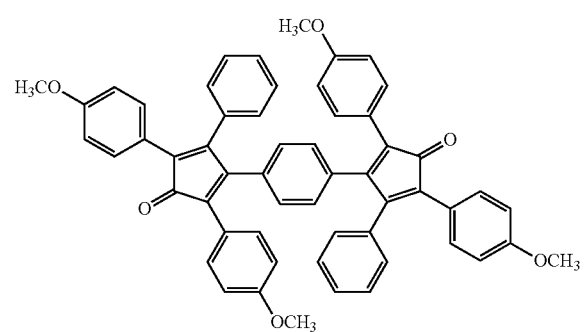

Structure III

The new synthesis method we developed for making MeOCPD was based on the published synthesis of a similar bis(cyclopentadienone) monomer (See Ogliaruso, M. A.; Romanelli, M. G.; Becker, E. I. Chem. Rev. 1965, 65, 261, which is incorporated herein by reference). As illustrated in FIG. 9, a mixture of 4,4'-dimethoxy dibenzylketone (dM-DBK) (12.35 g, 45.7 mmol) and 4-phenylglyoxalylbenzil (7.70 g, 22.5 mmol) in ethanol (195 mL) was stirred and heated until a solution formed. A solution of KOH (1.26 g, 22.5 mmol) in water (2 mL) was carefully added and the solution was heated at reflux for 1 h. The solution was then cooled to room temperature and stirred for 18 h. The resulting mixture was filtered and the filtrate was triturated with water and then with ethanol, after which it was collected by filtration and dried under vacuum at 120° C. to yield MeOCPD as a dark purple solid (7.97 g, 44%).

b) Synthesis of DAPP-MeODAPP Copolymer

Next, we needed a DAPP-based copolymer in which 10% of the repeat units have hydroxy functional groups that could react with an epoxy. The preparation of a copolymer in which the ratio of repeat units containing 4 methoxy groups to repeat units containing no methoxy groups is 1:9 is given (see FIG. 10). The polymerization was based on a modification of the procedure of Fujimoto et al. See Cornelius, C. J.; Fujimoto, C. H.; Hickner, M. A. U.S. Pat. No. 7,301,002, which is incorporated herein by reference. Cyclopentadienone (CPD) (10.163 g, 14.711 mmol), MeOCPD from step a) above (1.326 g, 1.635 mmol), 1,4-diethynylbenzene (2.062 g, 16.35 mmol), and diphenyl ether (57 mL) were charged to a flask under argon. The mixture was frozen in a dry ice/acetone bath and then freeze-thaw degassed (2 times) before heating at 165° C. for 18 h. The reaction was cooled to 100° C. and toluene (50 mL) was added to thin the solution before cooling to room temperature. The solution was poured into excess acetone, and a precipitate formed. The precipitate was dried, dissolved in toluene (50 mL), and reprecipitated into acetone. The resulting solid was dried under vacuum at 150° C. to yield a tan solid (12.34 g, 98%).

c) Demethylation of DAPP-MeODAPP Copolymer

Next, after polymerization, the copolymer was treated with boron tribromide (BBr$_3$) to convert the methoxy groups into reactive hydroxyl groups. DAPP-MeODAPP copolymer (12.16 g) was dissolved in dichloromethane (365 mL) under argon. A solution of BBr$_3$ (1.78 mL, 3 equivalents per methoxy group) in dichloromethane (10 mL) was added and the solution was stirred at room temperature for 18 h. The solution was carefully transferred to a beaker containing NaOH (24 g) dissolved in water (1.2 L) and the mixture was warmed at 50° C. for 8 h. The precipitate was then collected and mixed with water in a Waring blender. The solid material was then triturated with ethanol, 1 M HCl, and finally with water. The resulting solid was dried under vacuum at 100° C. to yield a tan solid (11.66 g, 97%), which we have named DAPP-OHDAPP.

d) Solution Sulfonation of DAPP-OHDAPP

The next step is solution sulfonation. The DAPP-OHDAPP copolymer (8.00 g) was dissolved in dichloromethane (325 mL). Trimethylsilyl chlorosulfonate (TMSCS) (6.5 mL, 42 mmol) was added and the reaction was stirred for 6 h at room temperature. The resulting solid was mixed with water (500 mL) plus NaOH (1 g, 25 mmol) in a Waring blender. The solid was then mixed with a solution of NaOH (20 g, 500 mmol) in water (500 mL) at reflux for 18 h. After washing with water, it was then dried under vacuum at room temperature to yield a tan solid (8.31 g). It should be noted that any attempts to sulfonate at a higher level (e.g., by using more TMSCS) resulted in a polymer that was insoluble and could not be cast.

e) Casting and Crosslinking of Films

The solution-sulfonated DAPP-OHDAPP copolymer (0.75 g) was then dissolved in N,N-dimethylacetamide (16 mL). The tetra-epoxy crosslinking agent, tetraglycidyl bis(p-aminophenyl)methane (82 mg, 0.19 mmol), and catalyst, triphenylphosphine (2.0 mg, 0.007 mmol), were added to the solution, which was then stirred for 1 h. The solution was then filtered (i.e., cast) into a glass dish (25 in$^2$), which was placed in a vacuum oven and dried at 45° C. for 24 h. The cast film was then removed from the dish and cured in an oven at 150° C. (in air at atmospheric pressure) for 1.5 h to allow the crosslinking reaction to take place.

f) Solid State Sulfonation of Crosslinked Films

To further increase the degree of sulfonation, the crosslinked membrane was immersed in a solution of trimethylsilyl chlorosulfonate (1.8 mL, 12 mmol) in dichloromethane (220 mL) for 7 hours at room temperature. The membrane was then removed and immersed successively in 1 M NaOH at 80° C. for 2 hours, 1 M $H_2SO_4$ at 23° C. for 24 hours, and water at 23° C. for 24 hours. FIG. 11 illustrates schematically the final structure of the resulting film (recognizing that the actual 3-D network of epoxy crosslinks is more complex than the simple illustration of FIG. 11).

Optionally, the solution-sulfonating step (step d above) can be skipped, relying instead on only performing the solid-state sulfonation instep f).

Test Results

Table 3 lists the membrane samples that were prepared by the epoxy crosslinking method and some of their characterization data. Line 1 in Table 3 (6-79-A) lists a sample with the highest possible initial IEC value (as mentioned above). The IEC value is basically unaffected by the casting and crosslinking process which is to be expected since the crosslinking mechanism (FIG. 8) does not involve the sulfonic acid groups. The conductivity of this sample was not measured but given its final IEC and water uptake values, it can be reasonably estimated that it should be about 40-50 mS/cm. Given these properties, this sample performed surprisingly well in the electrolysis cell, but there was clearly a need to increase the IEC of these membranes above 1.91.

Results from the testing of several of these epoxy-crosslinked membranes in the $SO_2$ electrolyzer are listed in Table 4. Line 3 shows the performance of the only sample of epoxy-crosslinked membrane that was not subjected to the solid state sulfonation procedure and consequently, it has the lowest IEC. Its thickness falls right between those of the two uncrosslinked SDAPP membranes (lines 1 and 2) and its current output also falls approximately midway between those two. This suggests that 6-79-C performs very similarly to SDAPP even though an uncrosslinked SDAPP membrane with the same IEC would have been expected to perform much poorer than the new epoxy-crosslinked membrane did.

Lines 4-6 show membranes with increasingly higher IEC values, and the cell performances all increase as well, although in a few cases (the data at 120° C., for example) the current output trends do not match the IEC trends exactly. The important thing to note is that the membranes on lines 3-5 all had similar performance data while the membrane on line 6 was clearly the best performer at all three temperatures. Here again, these membranes all had thicknesses that fall between the two SDAPP control samples but the current output for 6-87-F at 130 and 140° C. is essentially equal to that for the thinner SDAPP (line 1). So while the crosslinked membranes are still not outperforming uncrosslinked SDAPP, there is every reason to believe that they will if they are prepared with lower thicknesses. These epoxy-crosslinked membranes are all tough materials that do not tear and are easy to work with during MEA fabrication, so, making them thinner should not be a problem, unlike the thermally-crosslinked membranes. By preparing a membrane similar to 6-87-F but with a thickness of 50-60 microns, a current output of ≧8.0 A at 130° C. would be expected to be achieved.

We have fabricated a membrane electrode assembly with an EXSDAPP membrane with a thickness (dry) of 50 μm and a proton conductivity of 126 mS/cm at 30° C. have seen a very high current density (1.1 A/cm$^2$ @ 0.7 V). This MEA has been tested for a total of 11 hours while maintaining a current density ≧1.1 A/cm$^2$ @ 0.7 V. Optionally, the membranes can be made thinner, which is a tradeoff between improved performance and durability.

Figure 12:
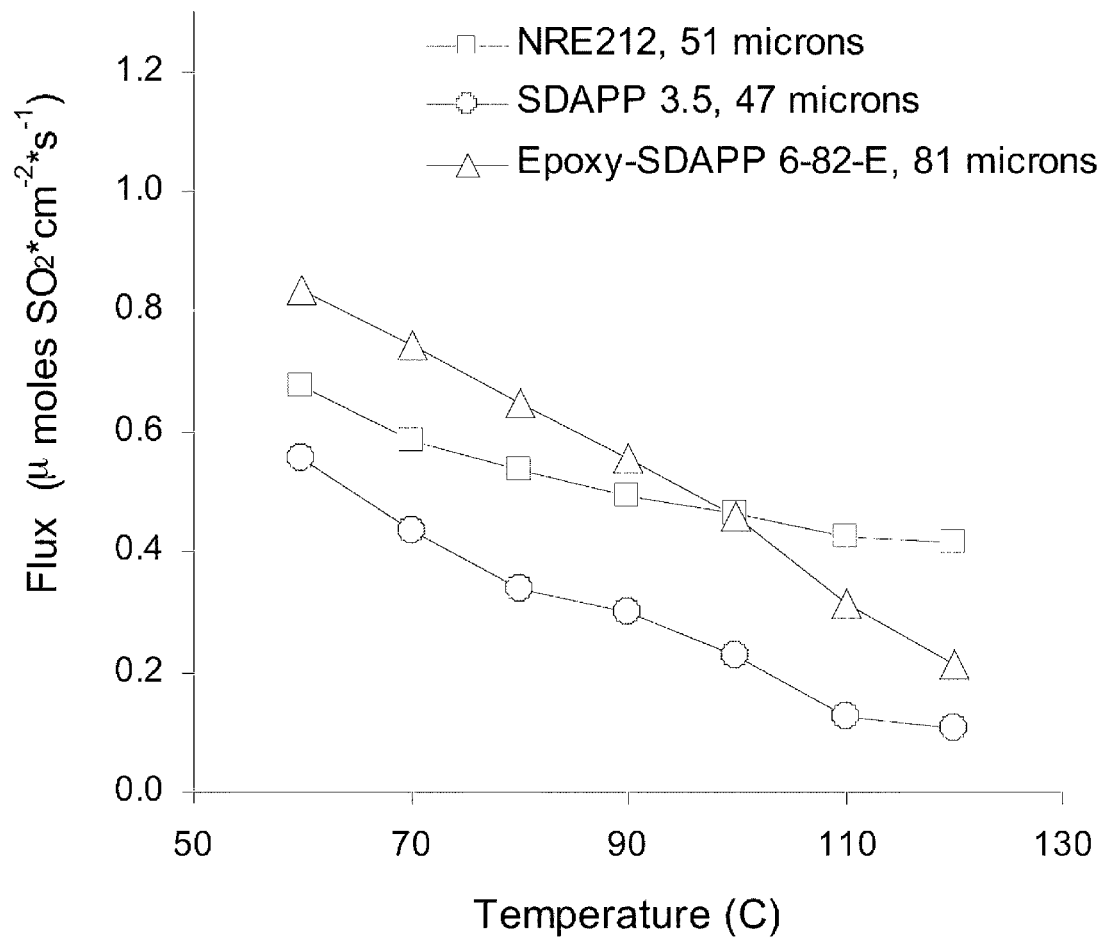
FIG. 12 shows a plot of $SO_2$ flux versus temperature.

FIG. 12 shows the results of $SO_2$ crossover testing at various temperatures with Nafion®, uncrosslinked SDAPP, and one of the epoxy-crosslinked membranes (6-82-E). As had been seen in previous testing, SDAPP consistently has lower crossover than Nafion® of a comparable thickness at all temperatures. The crosslinked membrane has the highest crossover rate at temperatures below 100° C., but at 120° C. it outperforms Nafion® and the trends indicate that it should be very similar to SDAPP at 130° C. even after accounting for differences in thickness. Although one might intuitively reason that the crosslinked membranes should form a more impenetrable network (and therefore have lower $SO_2$ crossover at all temperatures), the epoxy-crosslinked membranes have high water uptakes, which cause the polymer network to be more open, thus allowing some $SO_2$ to pass through.

An interesting, and unexpected, artifact was discovered during development of these improved methods. We discovered that the color of the epoxy-crosslinked membranes is pH-dependent. After soaking in 1M $H_2SO_4$ and 1 M NaOH, the color changes from tan/amber at high pH to dark green at low pH.

The epoxy-crosslinked sulfonated poly(phenylenes) of the present invention are also useful as battery separators, electrolytes for electrosynthesis cells, electrolytes for electrolysis cells, electrolytes for gas generating electrochemical systems, as ionic membranes in electrochemical sensors, as electrolytes in electrochemical scrubbers and other purification systems and as electrolytes in primary and secondary batteries.

TABLE 1

Characterization data for thermally crosslinked SDAPP membranes.

| Line number | Notebook number | Initial IEC (meq/g) | Initial Water Uptake (wt. %) | Curing conditions | Final IEC (meq/g) | Final Water Uptake (wt. %) |
|---|---|---|---|---|---|---|
| 1 | 6-38-B | 2.52 | 114 | 160° C., 2.25 h | 2.49 | 117 |
| 2 | 6-38-C | 2.52 | 114 | 180° C., 1.5 h | 2.52 | 98 |
| 3 | 6-38-D | 2.52 | 114 | 160° C., 1 h | 2.50 | 108 |
| 4 | 6-45-E | 3.11 | 221 | 180° C., 1.5 h | 3.10 | 225 |
| 5 | 6-45-G | 3.11 | 221 | 180° C., 3 h | 3.07 | 206 |
| 6 | 6-47-C | 2.77 | 135 | 180° C., 3 h | 2.73 | 133 |
| 7 | 6-47-D | 2.77 | 135 | 200° C., 3 h | 2.69 | 126 |
| 8 | 6-47-H | 2.22 | 82 | 200° C., 3 h + 220° C., 2 h | 2.11 | 76 |
| 9 | 6-47-I | 2.22 | 82 | 180° C., 4.5 h | 2.12 | 66 |
| 10 | 6-64-C | 3.95 | 231 | 200° C., 3.5 h | 3.90 | 166 |
| 11 | 6-64-J | 3.95 | 231 | 200° C., 3.5 h | 3.51 | 239 |
| 12 | 6-69-C | 2.88 | 135 | 200° C., 2.5 h | 2.83 | 125 |

TABLE 2

$SO_2$ electrolysis performance with thermally crosslinked membranes.

| Line number | Notebook number | IEC (meq/g) | Membrane thickness (μm) | Cell performance at 0.7 V (A) | | |
|---|---|---|---|---|---|---|
| | | | | 120° C. | 130° C. | 140° C. |
| 1 | 5-192-C | 2.52 | 37 | 6.5 | 7.0 | 6.7 |
| 2 | 5-192-C | 2.52 | 50 | 6.4 | 6.2 | 5.7 |
| 3 | 6-38-G | 2.52 | 111 | 4.5 | 4.5 | 4.5 |
| 4 | 6-38-E | 2.52 | 57 | 5.1 | 5.6 | — |
| 5 | 6-38-F | 2.58 | 68 | 5.2 | 5.3 | 4.9 |
| 6 | 6-38-H | 2.58 | 130 | 4.2 | 4.4 | 4.3 |
| 7 | 6-47-D | 2.69 | 112 | 5.0 | 5.0 | 5.0 |
| 8 | 6-69-C | 2.83 | 115 | 6.3 | 5.9 | 5.9 |
| 9 | 6-64-J | 3.52 | 164 | 5.1 | 4.5 | — |

TABLE 3

Characterization data for EXSDAPP membranes.

| Line Number | Notebook number | Initial IEC (meq/g) | Initial Water Uptake (wt. %) | Final IEC (meq/g) | Final Water Uptake (wt. %) | Final Conductivity (mS/cm) |
|---|---|---|---|---|---|---|
| 1 | 6-79-C | 1.94 | 47 | 1.91 | 44 | N/A |
| 2 | 6-79-E | 1.91 | 44 | 3.92 | 907 | 63 |
| 3 | 6-79-F | 1.91 | 44 | 3.61 | 357 | 141 |
| 4 | 6-82-B | 1.91 | 44 | 2.87 | 137 | 134 |
| 5 | 6-82-C | 1.91 | 44 | 2.16 | 75 | 70 |
| 6 | 6-82-D | 1.91 | 44 | 2.12 | 72 | 76 |
| 7 | 6-82-E | 1.91 | 44 | 2.22 | 111 | 96 |
| 8 | 6-87-D | 1.70 | 36 | 2.32 | 101 | 83 |
| 9 | 6-87-E | 1.70 | 36 | 2.50 | 114 | 108 |
| 10 | 6-87-F | 1.70 | 36 | 3.05 | 150 | 183 |
| 11 | 6-87-G | 1.70 | 36 | 2.60 | 123 | 134 |

TABLE 4

$SO_2$ electrolysis performance with EXSDAPP membranes.

| Line number | Notebook number | IEC (meq/g) | Membrane thickness (μm) | Cell performance at 0.7 V (A) 120° C. | 130° C. | 140° C. |
|---|---|---|---|---|---|---|
| 1 | 5-192-C | 2.52 | 50 | 6.4 | 6.2 | 5.7 |
| 2 | 6-38-G | 2.52 | 111 | 4.5 | 4.5 | 4.5 |
| 3 | 6-79-C | 1.91 | 78 | 5.7 | 5.2 | 4.9 |
| 4 | 6-82-D | 2.12 | 86 | 5.6 | 5.9 | 5.4 |
| 5 | 6-82-E | 2.22 | 81 | 5.5 | 5.7 | 5.4 |
| 6 | 6-87-F | 3.05 | 89 | 5.9 | 6.1 | 5.7 |

The invention claimed is:

1. An epoxy-crosslinked sulfonated poly(phenylene) copolymer composition, synthesized by crosslinking a copolymer made of a sulfonated poly(phenylene) and a tetrahydroxy bis(cyclopentadienone) with a tetra-epoxy crosslinking agent, according to the following reaction:

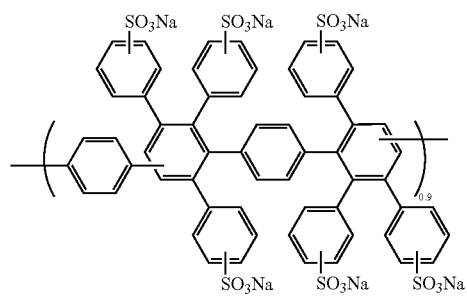

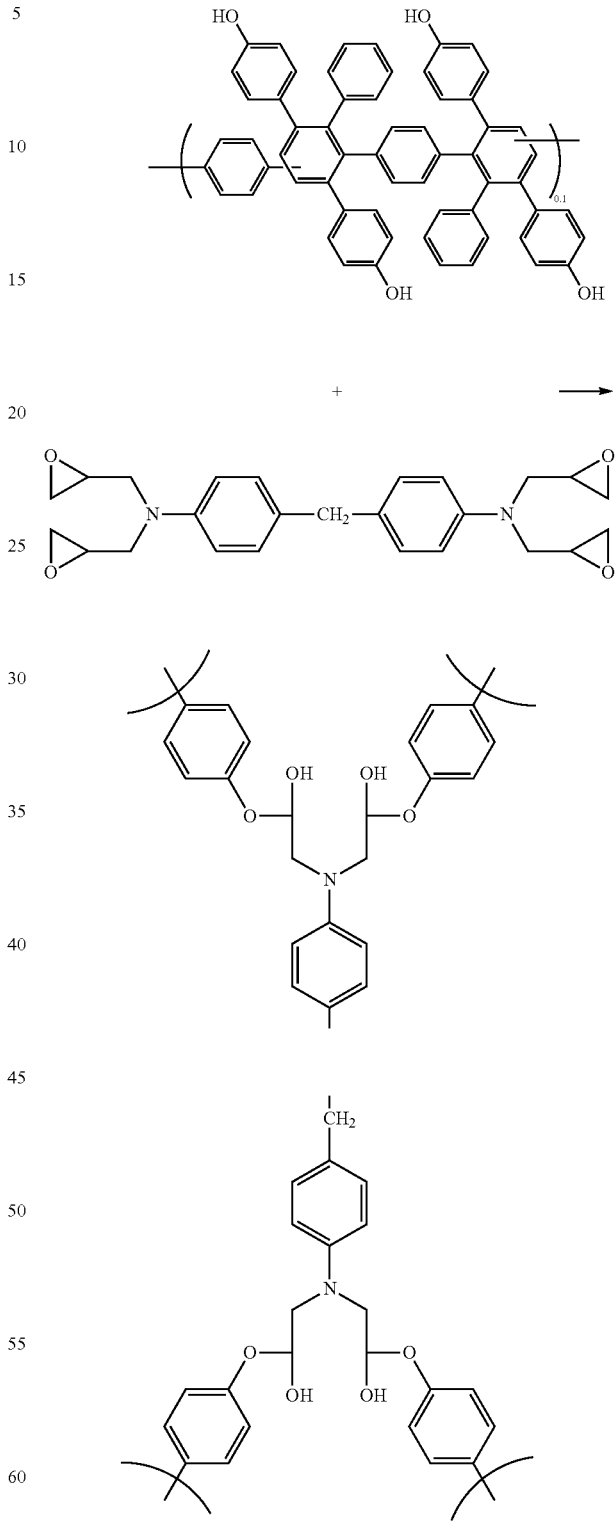

followed by curing the mixture at a temperature in the range of 150° C. to 200° C. for 1 to 6 hours.

2. An epoxy-crosslinked sulfonated poly(phenylene) copolymer composition having the following structure:

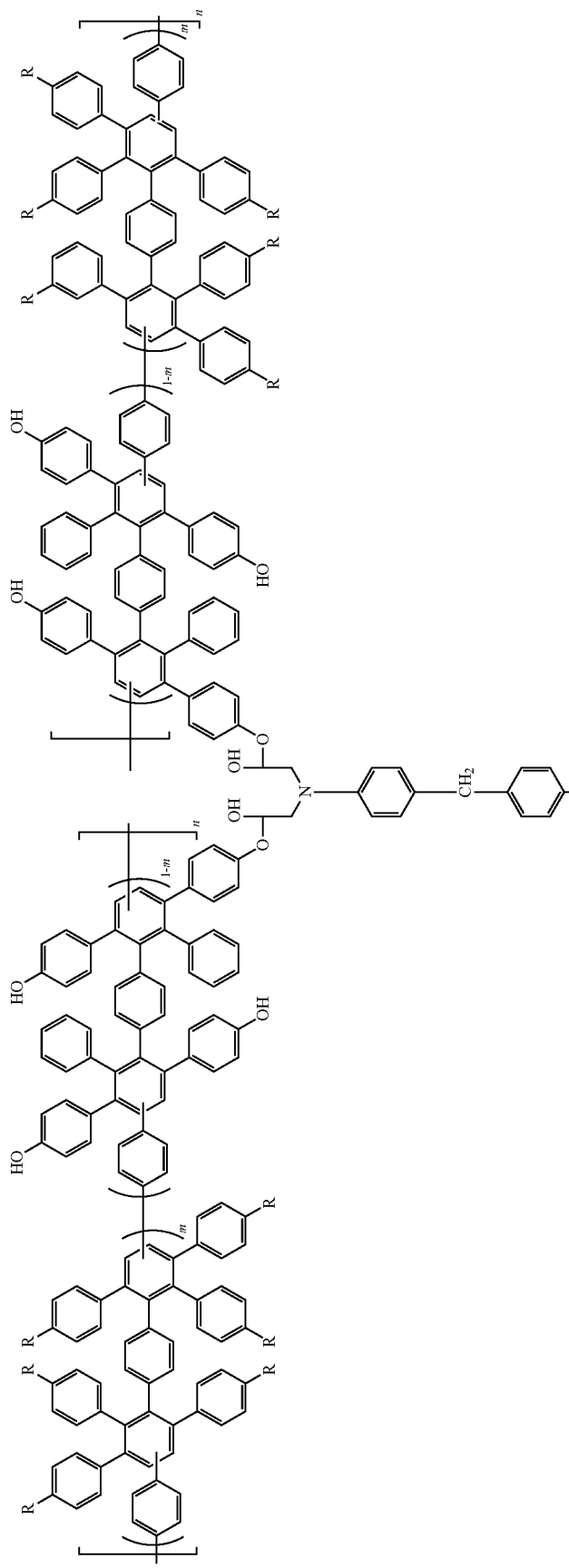
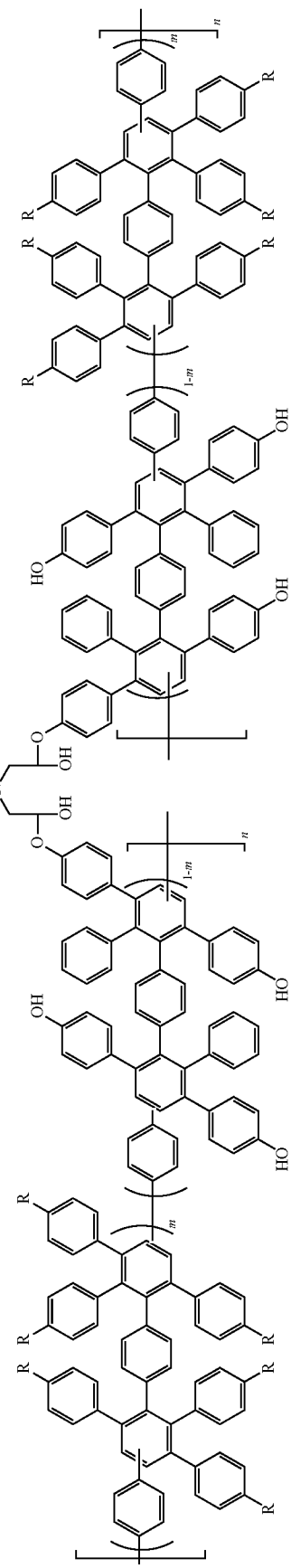

where m=0.01 to 0.99, and R═H or SO$_3$H; and at least one of the R groups is SO$_3$H.

3. The epoxy-crosslinked sulfonated poly(phenylene) copolymer composition of claim 2, wherein the composition has an ion exchange capacity (IEC) from 2.2 to 3.8 meq/g.

4. The epoxy-crosslinked sulfonated poly(phenylene) copolymer composition of claim 2, wherein m=0.9 and R═SO$_3$H.

5. The epoxy-crosslinked sulfonated poly(phenylene) copolymer composition of claim 2, wherein 25% to 83% of the R groups are —SO$_3$H groups.

6. The epoxy-crosslinked sulfonated poly(phenylene) copolymer composition of claim 2, wherein R═SO$_3$H, and the number of sulfonic acid groups per polymer repeat unit ranges from 1.5 to 5.

7. The epoxy-crosslinked sulfonated poly(phenylene) copolymer composition of claim 2, wherein the number of polymer repeat units, n, ranges from 10 to 300.

8. The epoxy-crosslinked sulfonated poly(phenylene) copolymer composition of claim 2, wherein the ratio of crosslinking agent to the number of reactive hydroxy sites on the polymer ranges from 1 to 4 epoxy groups per hydroxy group.

9. The epoxy-crosslinked sulfonated poly(phenylene) copolymer composition of claim 2, wherein the composition has a proton conductivity from 63 to 183 mS/cm in liquid water at 30° C.

* * * * *